United States Patent
Sailer et al.

[11] 3,891,617
[45] June 24, 1975

[54] METALLIZED AND NON-METALLIZED DIPHENOL METHANE CONTAINING AZO DYESTUFFS

[75] Inventors: Andre Louis Sailer; Pierre Frank, both of Saint-Clair du Rhone, France

[73] Assignee: Pechiney Ugine Kuhlmann, Paris, France

[22] Filed: Jan. 26, 1973

[21] Appl. No.: 326,728

[30] Foreign Application Priority Data
July 23, 1968 United Kingdom............. 35075/68

[52] U.S. Cl. ................. 260/148; 8/13; 260/144; 260/145 C; 260/166; 260/179; 260/184
[51] Int. Cl. .................. C09b 33/04; C09b 45/28
[58] Field of Search .......... 260/174, 179, 184, 186, 260/148, 166

[56] References Cited
UNITED STATES PATENTS
| | | | |
|---|---|---|---|
| 2,817,660 | 12/1957 | Schmid et al. | 260/178 |
| 2,835,660 | 5/1958 | Baumann | 260/179 |
| 3,759,892 | 9/1973 | Wicki | 260/173 |

*Primary Examiner*—Henry R. Jiles
*Assistant Examiner*—Robert W. Ramsuer
*Attorney, Agent, or Firm*—Browne, Beveridge, Degrandi & Kline

[57] ABSTRACT

Dyestuff of the formula:

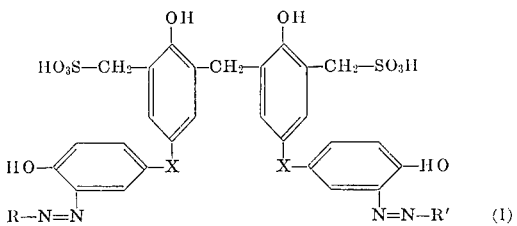

in which X represents a sulphonyl or isopropylidene group and R and R' are the same or different and each represents a residue of a diazotisable aromatic primary amine which may carry in the ortho position to the amino group a group capable of taking part in the formation of a metalliferous complex, and metalliferous complexes thereof. These dyestuffs are useful for the colouration of leather and may be prepared by coupling a compound of the formula:

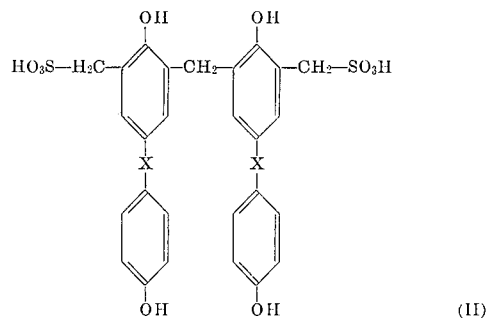

with a diazo derivative of an amine of formula R—$NH_2$ or R'—$NH_2$ or the diazo derivatives of such amines, at the rate of two moles of diazo derivative or derivatives per mole of compound of formula (II). The dyestuffs give dyeings which possess good fastness to washing, solvents and light.

6 Claims, No Drawings

METALLIZED AND NON-METALLIZED DIPHENOL METHANE CONTAINING AZO DYESTUFFS

The present invention relates to new azo dyestuffs which are particularly useful for the colouration of leather.

When leather in "pastel" shades is wanted, it is not possible to use small quantities of the conventional dyestuffs, since although this process gives light colours, the dyestuffs are only fixed on the surface and do not penetrate beyond this; the colouration are very unlevel and have a particularly poor fastness to light. In order to obtain pastel shades, therefore, normal amounts of dyestuffs are used and auxiliary products which retard the absorption of the dyestuffs are added to the dyebaths. These auxiliary products, which are synthetic tannins, retard the absorption of the dyestuffs and thus facilitate their penetration and improve the levelness of the colourations. very light level shades with good penetration are obtained by means of this process but it has two principal disadvantages. As the synthetic tannins oppose the absorption of the dyestuffs, the amounts of dyestuffs responsible in practice for the dyeing are much less than those actually present in the dyebath and this results in loss of dyestuff. The problem of the fastness to light is not solved, since a dyestuff used for a light shade has a fastness to light which is distinctly less than for a normal shade. Finally, large quantities of the synthetic tannins have to be used, and these have a disastrous effect on the hair side of the leather.

According to the present invention it has now been found that dyestuffs of the following general formula

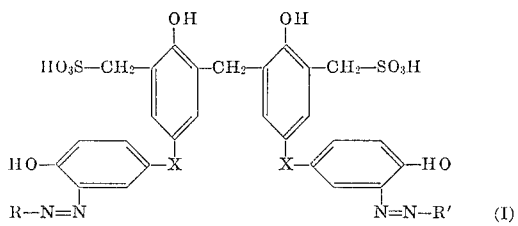

wherein X represents a sulphonyl or isopropylidene group and R and R' each represent a residue of a diazotisable aromatic primary amine which may carry in the ortho position to the amino group a group capable of taking part in the formation of a metalliferous complex, and the metalliferous complexes which may be derived from these dyestuffs, when they are applied in the quantity normally used to leather tanned in any way, for example box calf, suede calf or sheep-skin clothing, give bright pastel shades which are level, have good penetration and are particularly fast to light, washing, solvents and rubbing and that after dyeing, practically no dyestuff remains in the bath. The residues R and R' may be different from each other but are preferably identical.

Up to now, no dyestuffs were known which had these characteristics and these advantages. Dyestuffs do exist which have a constitution more or less similar to that of the dyestuffs of formula (I), for example the dyestuffs derived from 2,4,2',4'-tetrahydroxy-diphenylmethane described in French Pat. No. 1,374,163 or those derived from 2,4,2',4', tetrahydroxy-benzophenone described in Patent of Addition No. 72,418 to French Pat. No. 1,165,637 or the derivatives of 5,5'-dihydroxy-2,2'-dinaphthylamino-7,7'-disulphonic acid described in French Pat. No. 1,212,334 or the derivatives of 2,4-dihydroxy-benzophenone described in French Pat. No. 1,165,637 or finally the derivatives of 3,3'-dihydroxy-diphenylamine described in French Pat. No. 1,188,062. These dyestuffs however do not give pastel shades on leather. As to the dyestuffs derived from 2,2-bis(4-hydroxy-phenyl)-propane, such as those described in French Pat. No. 1,471,639, they have only little affinity for leather and the shades obtained with these dyestuffs have a particularly poor fastness to light.

The dyestuffs of formula (I) may be prepared for example by coupling a compound of the general formula:

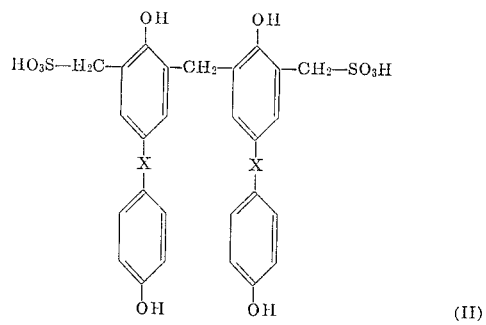

in which X has the same significance as above, with a diazo derivative of an amine of formula $R-NH_2$ or $R'-NH_2$ or a mixture of the diazo derivatives of such amines, at the rate of two moles of diazo derivative per mole of the compound of formula (II), R and R' having the same significance as above.

These amines of formulae $R-NH_2$ and $R'-NH_2$ may belong for example to the benzene or naphthalene series and they may be mono- or polycyclic such as for example the diphenylamines or aminoazobenzenes. They may carry in the ortho position to the amino group a group capable of taking part in the formation of a metalliferous complex, for example, a hydroxy or carboxy group. In such case, the dyestuffs derived therefrom may be used to prepare metalliferous complexes, for example, complexes of copper, iron, nickel, chromium or cobalt. The conversion of the dyestuffs of formula (I) into metalliferous complexes may be effected for example in aqueous medium, at a temperature between 20°C. and 100°C. at a pH between 2 and 10, preferably between pH 4 and pH 8, by means of a metal salt such as chloride, fluoride, sulphate, acetate or formate, or a metal hydroxide or oxide. Iron, chromium and cobalt give complexes in which two molecules of dyestuff are linked to two metal atoms. Copper and nickel give complexes in which two metal atoms are linked to one molecule of dyestuff.

If the two positions ortho to the group $NH_2$ are free, the dyestuffs of formula (I) may be converted into copper complexes by oxidising treatment with copper salts. It has already been previously indicated that under the action of an oxidising agent, O-monohydroxy-azo dyestuffs are converted into copper complexes of 0,0'- dihydroxyazo dyestuffs. The operation is preferably effected in a weakly acid medium (pH from 5 to 7) and the presence of at least an equivalent amount of copper salts (French Pat. No. 1,020,972). Examples of oxidising agents are air, peroxides such as those of hydrogen and of alkali metals, per-salts and per acids.

In the following Examples which are purely illustrative the parts indicated are parts by weight unless the contrary is stated.

EXAMPLE 1

27.6 parts of 4-nitroaniline are diazotised in the usual way, then the diazo derivative is poured in a period of an hour into a solution, cooled to 10°C., of 70 parts of bis [2-hydroxy-3-sulphomethyl-5-(4-hydroxyphenylsulphonyl)-phenyl]-methane in 500 parts of water containing 50 parts of sodium carbonate.

When the coupling is finished, the dyestuff obtained is precipitated by the addition of hydrochloric acid and sodium chloride, and is filtered and dried. This bis[2-hydroxy-3-sulphomethyl-5-(4-hydroxy-4'-nitro-3-phenylazo-phenylsulphonyl)-phenyl]-methane dyes leathers from different tanning processes in yellowish beige shades which are particularly fast to washing, solvents and light.

EXAMPLE 2

If in the preceding Example, the 4-nitro-aniline is replaced by 18.6 parts of aniline then bis [2-hydroxy-3-sulphomethyl-5-(4-hydroxy-3-phenylazo-phenylsulphonyl)-phenyl]-methane is obtained which dyes leathers from different tanning processes in slightly more yellow shades.

EXAMPLE 3

If in the preceding Example the aniline is replaced by 25.5 parts of 3-chloro-aniline then bis[2-hydroxy-3-sulphomethyl-5-(4-hydroxy-3'-chloro-3-phenylazo-phenylsulphonyl)-phenyl]-methane is obtained which dyes leather in yellowish beige shades.

EXAMPLE 4

If in Example 1 this bis [2-hydroxy-3-sulphomethyl-5-(4-hydroxy-phenylsulphonyl)-phenyl]-methane is replaced by 65.6 parts of bis[2-hydroxy-3-sulphomethyl-5-(4-hydroxy-$\alpha,\alpha$-dimethylbenzyl)-phenyl]-methane then bis[2-hydroxy-3-sulphomethyl-5- (4-hydroxy-4'-nitro-3-phenylazo-$\alpha,\alpha$-dimethylbenzyl)-phenyl]-methane is obtained which dyes leather in yellowish beige shades.

EXAMPLE 5

If, in the preceding Example, the 4-nitro-aniline is replaced by 28.7 parts of 4-chloro-2-amino-phenol then bis[2-hydroxy-3-sulphomethyl-5-(4-hydroxy-5'-chloro-2'-hydroxy-3-phenylazo-$\alpha,\alpha$-dimethyl-benzyl)-phenyl]-methane is obtained which dyes leathers from different tanning processes in rose beige shades.

EXAMPLE 6

If in Example 4, the 4-nitro-aniline is replaced by 46.8 parts of 4-nitro-2-amino-phenol-6-sulphonic acid then bis[2-hydroxy-3-sulphomethyl-5(4-hydroxy-5'-nitro-3'-sulpho-2'-hydroxy-3-phenylazo-$\alpha,\alpha$-dimethylbenzyl)-phenyl]-methane is obtained which dyes leathers from different tanning processes in a beige shade.

EXAMPLE 7

If in Example 4, the 4-nitro-aniline is replaced by 44.7 parts of 4-chloro-2-amino-phenol-6-sulphonic acid then bis[2-hydroxy-3-sulphomethyl-5(4-hydroxy-5'-chloro-3'-sulpho-2'-hydroxy-3-phenylazo-$\alpha$, $\alpha$-dimethylbenzyl)-phenyl]-methane is obtained which dyes leathers from different tanning processes in rose beige shades.

EXAMPLE 8

The diazo derivative of 27.6 parts of 4-nitro-aniline is coupled as indicated in Example 1 with 70 parts of bis[2-hydroxy-3-sulphomethyl-5(4-hydroxy-phenylsulphonyl)-phenyl]-methane, then a little hydrochloric acid is added in order to bring the solution to pH 7. The latter is heated to 70°C., a solution is added of 60 parts of copper sulphate pentahydrate in 600 parts of water at 70°C., then a solution of 70 parts of sodium acetate in 350 parts of water at 70°C. While maintaining at 70°C., 180 parts of a 10% solution of hydrogen peroxide are run in over an hour. The mixture is left to react for 1 hour at 70°C. and it is verified by chromatography that all the dyestuff has been converted into a copper complex. The copper complex, which contains 2 atoms of copper per molecule, is precipitated by the addition of sodium chloride, filtered and dried. It dyes leathers from different tanning processes in rose beige shades which are particularly fast to washing, solvents, and light.

EXAMPLE 9

One operates as in Example 8, but the dyestuff prepared as in Example 2 is used. A copper complex is obtained which contains 2 atoms of copper per molecule and dyes leathers from different tanning processes in yellowish beige shades.

EXAMPLE 10

The dyestuff of Example 5 is prepared, the medium in which it is formed is heated to 70°C. and a solution of 50 parts of copper sulphate pentahydrate in 500 parts of water is added. A little hydrochloric acid is added to bring the pH to about 6.5 and the mixture is heated at 70°C. for an hour. The double copper complex is obtained which is precipitated by the addition of salt, filtered off and dried. It dyes leathers from different tanning processes in rose shades.

EXAMPLE 11.

One operates as in Example 10, but the copper sulphate is replaced by 28.1 parts of cobalt sulphate heptahydrate. The 1:2 double complex of cobalt of the dyestuff of Example 5 is obtained. It dyes leathers from different tanning processes in pale violet shades.

EXAMPLE 12.

If in the process of Example 10 the dyestuff of Example 5 is replaced by that of Example 6, a copper complex of the dyestuff is obtained which contains 2 atoms of copper per molecule and dyes leathers from different tanning processes in rose shades.

EXAMPLE 13.

Following the method of operation of Example 10, the dyestuff of Example 6 is treated with 58.2 parts of nickel sulphate heptahydrate. The double nickel complex which dyes leathers from different tanning processes in orange-beige shades is obtained.

EXAMPLE 14.

One operates as Examle 10, but the dyestuff of Example 5 is replaced by that of Example 7. A copper complex is obtained which dyes leaters from different tanning processes in bluish rose shades.

EXAMPLE 15.

The dyestuff of Example 7 is prepared. Once the coupling is finished, it is heated to 90°C., a little hydrochloric acid is added to bring the pH to about 4.5, and then 90 parts of sodium acetate and finally 26.8 parts of chromic sulphate octahydrate are added. The mixture is maintained at 90°C. for an hour. The double 1:2 chromium complex is obtained which is precipitated by the addition of sodium chloride, filtered and dried. It dyes leathers from different tanning processes in light violet shades.

EXAMPLE 16.

18.4 parts of 4,4'-diamino-biphenyl are tetrazotised according to the usual process, then a solution at pH 7 of 34.1 parts of the monosodium salt of 1-amino-8-naphthol-3,6-disulphonic acid in 200 parts of water is run in 30 minutes. Then an aqueous solution of sodium carbonate is added in an hour in order to bring the pH to 3. The coupling is allowed to finish at this pH, the diazo compound prepared from 17.3 parts of sulphanilic acid is added in 10 minutes, and then 30 parts of sodium carbonate. When the coupling is ended, a solution of 35 parts of bis[2-hydroxy-3-sulphomethyl-5(4'-hydroxy-phenylsulphonyl)-phenyl]-methane in 350 parts of water is added. The coupling is allowed to finish. The bis[[2-hydroxy-3-sulphomethyl-5-[4-hydroxy-3{1''-amino-3'',6''-disulpho-8''-hydroxy-7''-p-sulphophenylazo-4'-naphthyl(2''')azo-biphenyl(4)azo}phenyisulphonyl]-phenyl]]-methane is precipitated by the addition of hydrochloric acid and sodium chloride, filtered off and dried. This dyestuff dyes leathers from different tanning processes in bluish grey shades.

EXAMPLE 17.

100 parts of a clear chrome box calf are rinsed, neutralised, rinsed again, then introduced into a fulling machine containing a solution of one part of the dyestuff of Example 8 in 500 parts of water. It is fulled for 45 minutes at 60°C. then a tawing paste suspended in 50 parts of water by means of a dispersing agent is introduced; it is fulled for 30 minutes and subjected to the usual treatments. The box calf is dyed uniformly a rose beige shade which is especially fast to the usual tests (washing, solvents and light).

EXAMPLE 18.

100 parts of a chrome tanned sheepskin for clothing, retanned by means of a synthetic tannin, are wetted again in the presence of a little ammonia. They are rinsed and introduced into a fulling machine containing a solution of 4 parts of the dyestuff of Example 1 in 2000 parts of water at 60°C. The leather is fulled for an hour at 60°C., then 2 parts of formic acid are introduced. The leather is fulled for 30 minutes, rinsed and dried. The skins obtained are dyed uniformly in a yellowish beige shade which is especially fast to the usual tests (washing, solvents and light).

We claim:

1. A dyestuff of the formula

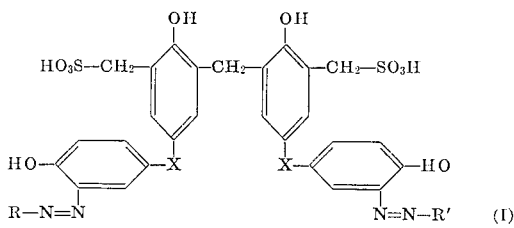

in which X is $-SO_2-$ or $-C(CH_3)_2-$, and R and R' are the same or different, and are selected from the group consisting of substituted and unsubstituted phenyl, naphthyl, diphenyl and phenylazophenyl where the substituents are selected from the group consisting of nitro, chloro, sulpho, hydroxy and carboxy.

2. A dyestuff according to claim 1, wherein R and R' are selected from the group consisting of phenyl, nitrophenyl, chlorophenyl, hydroxy-chlorophenyl, sulpho-nitro-hydroxy-phenyl and sulpho-chloro-hydroxy-phenyl.

3. Dyestuff according to claim 1 wherein R and R' are the same.

4. Metalliferous complex of a dyestuff as claimed in claim 1.

5. The bis [2-hydroxy-3-sulphomethyl-5-(4-hydroxy-4'-nitro-3-phenylazophenylsulphonyl)-phenyl] -methane.

6. The complex containing 3 atoms of copper per one molecule of bis [2-hydroxy-3-sulphomethyl-5-(4-hydroxy-4'-nitro-3-phenylazophenylsulphonyl-phenyl] -methane.

* * * * *

UNITED STATES PATENT OFFICE
CERTIFICATE OF CORRECTION

PATENT NO. : 3,891,617
DATED : June 24, 1975
INVENTOR(S) : ANDRE LOUIS SAILER ET AL It is certified that error appears in the above-identified patent and that said Letters Patent are hereby corrected as shown below:

-- Claims priority, application in France No. 7202511 filed January 26, 1972. --

Signed and Sealed this fourth Day of November 1975

[SEAL]

Attest:

RUTH C. MASON
Attesting Officer

C. MARSHALL DANN
Commissioner of Patents and Trademarks